March 1, 1949.    W. M. BOOTHBY    2,463,473
FLOW METER
Filed July 7, 1945    3 Sheets-Sheet 1
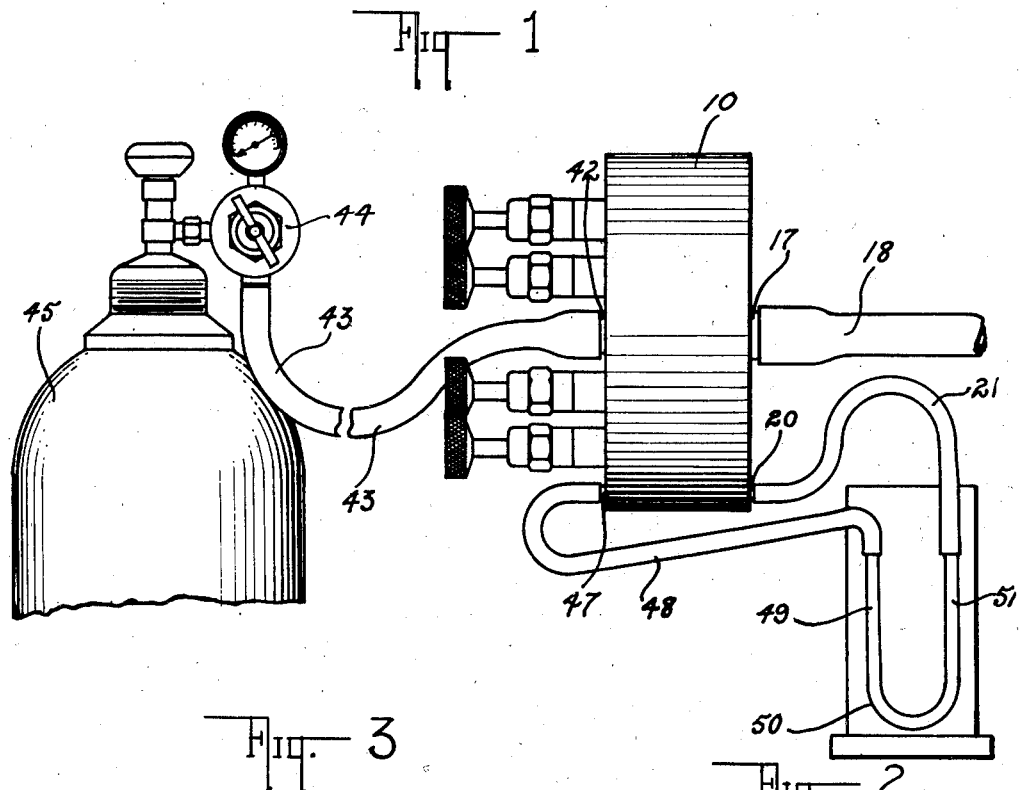
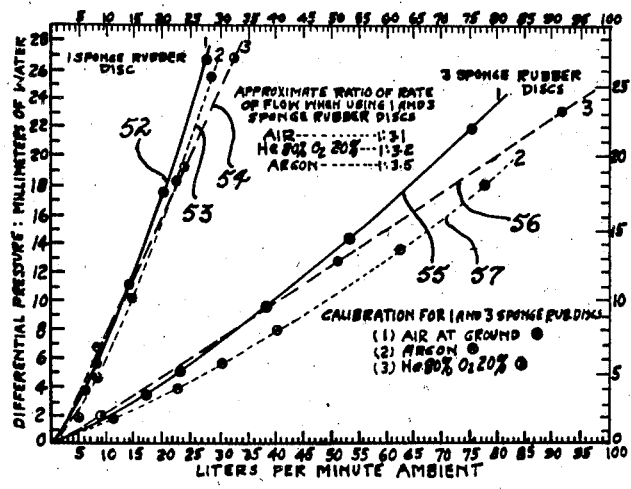
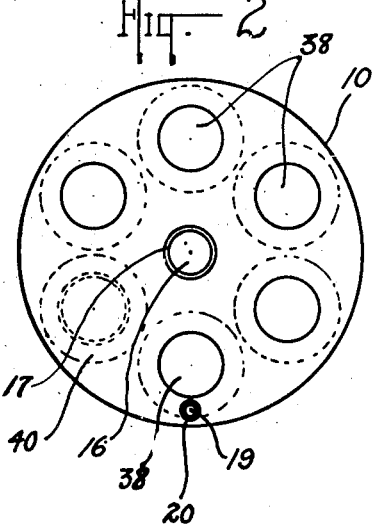
INVENTOR.
WALTER M. BOOTHBY
BY
ATTORNEY

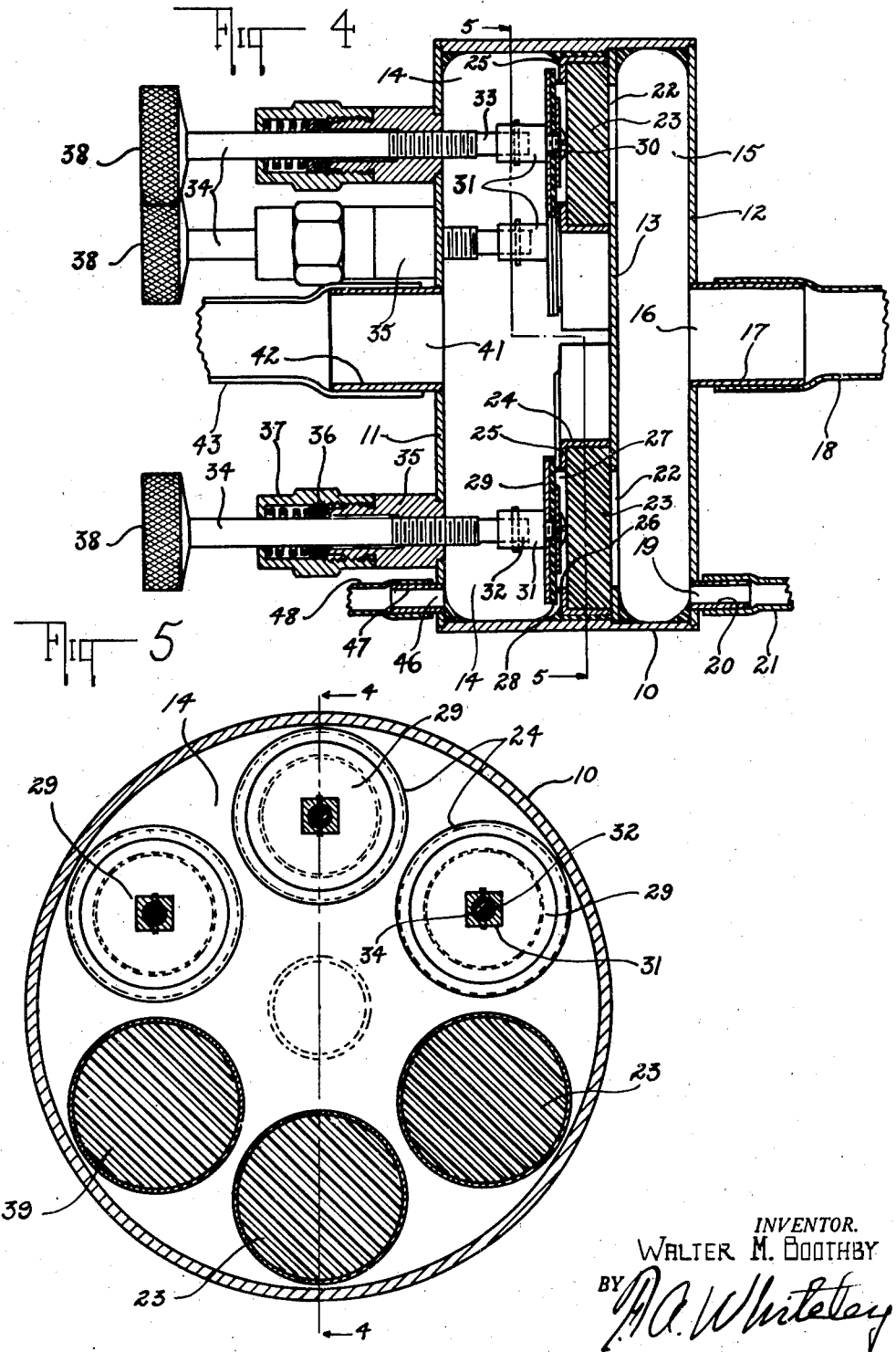

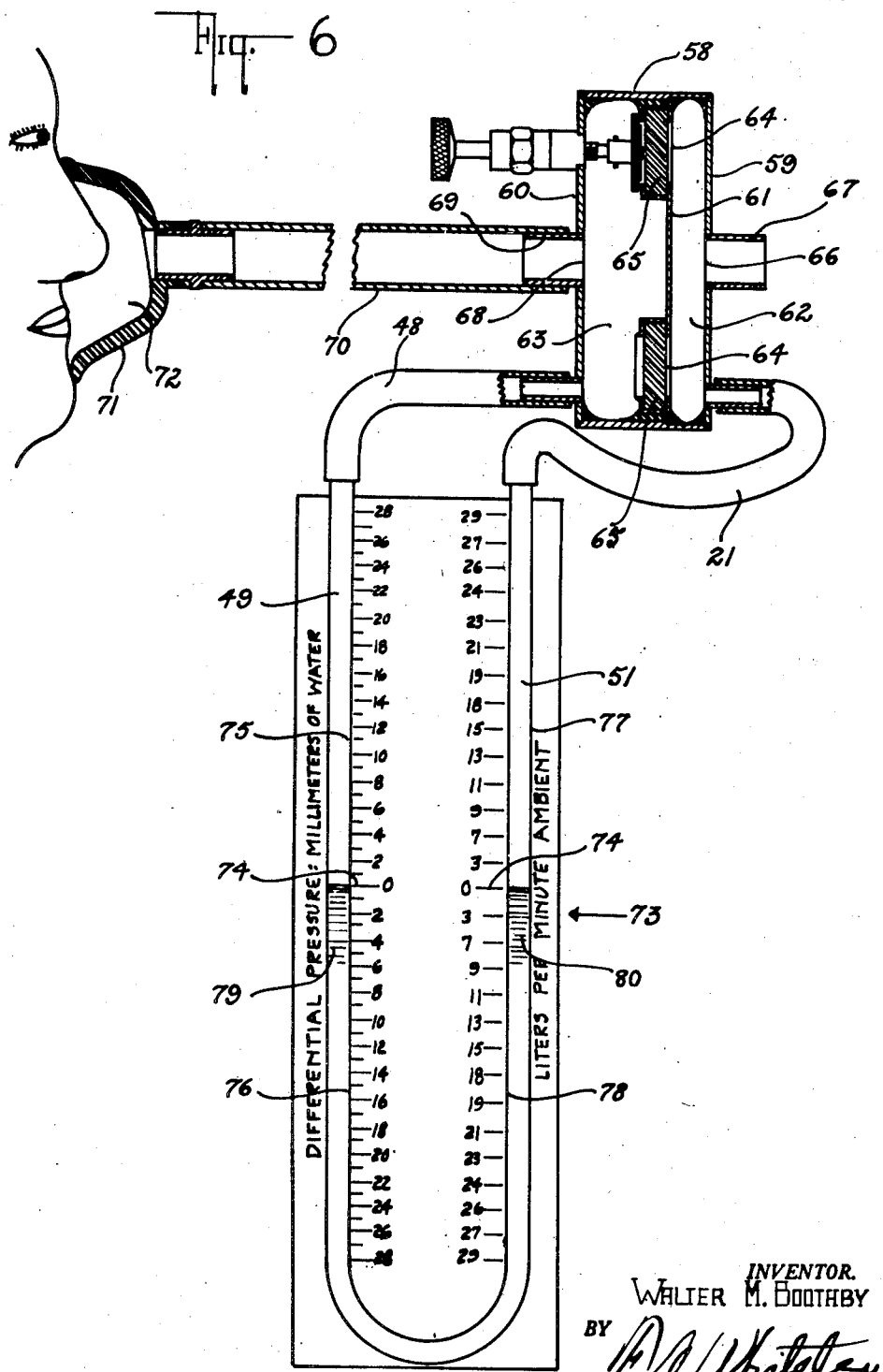

Patented Mar. 1, 1949

2,463,473

UNITED STATES PATENT OFFICE 2,463,473

FLOWMETER

Walter M. Boothby, Rochester, Minn.

Application July 7, 1945, Serial No. 603,703

6 Claims. (Cl. 128—142)

My invention relates to flow meters, adapted for use in connection with alternate or constant action gas flow, embodying a restrictor device which will produce, without the interfering factors of turbulence and flow laminations, a very slight differential pressure in a stream of gas at any constant rate of flow, or at any intermittent or variable rate of flow, or when flowing constantly or intermittently in repeatedly reversed directions. This differential pressure, such for example as the movement of gases in respiration, that is the repeated movement during inhalation followed repeatedly by the reverse movement during exhalation, is produced by causing the stream of gas to pass through a properly inserted and a sufficiently thick body of some porous and fairly homogeneous material, specifically of sponge rubber, containing both in parallel and in series many pores and cavities. Such a porous substance reduces and in practical effect eliminates error due to turbulence and flow lamination at site of measurement, and, therefore, the differential pressures so produced can be calibrated to represent accurately the rates of flow of gases in an essentially linear relationship at low differential pressures of 1 up to 200 and more millimeters of water for ambient rates of flow between 1 up to 200 and more liters per minute, wherein the calibrations derived from the use of this structure are nearly independent of the molecular weights or the density of such gases.

For obtaining readings for constant rates of flow, a simple U-tube water manometer in any one of its many modifications, such as is illustrated in Fig. 6, may be used. For rapidly varying or reversing rates of flow of a gas, a glass spoon type of a Bourdon tube with a mirror attachment to throw a beam of light on a moving photographic film may be used. An electronic type of recording apparatus (not shown) would be suitable when great accuracy in measuring rapidly changing rate of flow at very low pressure is desired.

In general my invention, by use of the aforesaid restrictor device, has to do with the making of proper calibrations to show differential pressures on opposite sides of the restrictor and the delivery rate or volume per unit of time of the flow of gases in units per minute ambient, and one practical application of my invention is, by the use of the restrictor device, to measure respiration of individuals for both volume of inhalation and volume of exhalation, another is to measure the air flow in cubic feet per minute of ventilating and hot air heating systems of all kinds.

Flow meters generally used are of two types. One of these is the float type, in which gas is delivered under pressure to the lower part of an expanding chamber and a float in the chamber having an index finger against a calibrated scale indicates the volume of gas being delivered at pressures which are varied to produce delivery of gases at the desired volume rate of flow.

The second type of flow meter embodies a casing having a partition across the space within the casing which divides that space into two chambers. The partition is provided with an open hole or orifice usually circular, at its center and of smaller area than that of the main pipe or duct, and the differential pressures between the two chambers are recorded by a manometer, and calibrations showing the volume of flow are obtained for use in connection with this orifice type of flow meter.

The first type of flow meter above noted is operative with the gases going only in one direction, while the second or simple orifice type may be operated with gases going in either direction.

The second type of flow meter, with which my invention is alone concerned, is fairly efficient where considerable pressures are employed, pressures which are sufficient to nullify turbulence in the second chamber and thus establish the necessary differential pressures which measure the volume passing through the meter.

But I have discovered that this simple orifice type of flow meter is inoperative for measuring the flow of gases going at low or very low pressures. Hence, it will not measure the volume of gases at these low pressures and renders less accurate the measurement of volumes of gases at somewhat higher pressures, and the calibrations derived therefrom.

I have further discovered that if a gas under pressure from any source, particularly when the pressure is low or very low, is delivered at such low pressures to the inlet part of a flow meter such as is referred to as the second type of flow meter, and the inlet part has flow connections to the outlet part through a restrictor device consisting of a sufficiently thick body of some properly porous and fairly homogeneous material, specifically of sponge rubber containing both in parallel and in series many pores and cavities, the differential pressures taken from those on the opposite sides of the restrictor may be made an index of the volume of flow, so closely accurate calibrations can be arrived at from such differential pressures, showing with substantial accuracy the volumes of gases passing through the flow meter. This is true for gases passing in either direction, either continuously or intermittently, and is true for gases delivered to the inlet chamber at low or very low pressures.

I have further discovered that if the rate of flow of delivery remains constant and the area of restriction is increased so the volume of gas passing through a given area of the restrictor is necessarily correspondingly decreased, the differential pressures will be decreased proportionately so that there will still be a relation between the differential pressures and the volume of flow being delivered, from which again accurate calibrations can be made, showing the volume of gas delivered through the greater area of restriction, which because of its essential porosity will be accurate for a wide range of pressures, especially including very low pressures. And since the restrictor area will be the same regardless of which direction the gases flow, it follows that calibrations based upon differential pressures when the gas is flowing in one direction will correspondingly apply to gases flowing in the opposite direction where the pressures of the gas and areas of the restrictor remain the same.

The device is effective for obtaining calibrations showing low and very low differential pressures and large rates of flow, where the gas is delivered at a fixed pressure and through a fixed area of the sponge rubber restrictor. In general these calibrations will be made with use of a weighted spirometer, by passing a constant flow of air or gas therethrough, the spirometer indicating the volume of gas delivered at a fixed pressure, from which the indicated differential pressures determined by the respective pressures on the two sides of the sponge rubber disk may be successively read at different flow-rates of gas delivery. These readings at successively higher differential pressures of delivery of gas and consequently larger volumes of gas delivered through the restrictor, are set off against figures showing the volume of flow per minute ambient actually being delivered for each increased differential pressure. In the same way when the area of the restrictor is increased, readings may be made for the lower differential pressures which will give a calibration for the increased volumes resulting from the increased restrictor area, all as shown in the graph forming part of the drawings.

It is an object of my invention, therefore, to effect determination of the volume or rate of flow of gases per unit of time in direct or reverse directions of flow, by employing an enclosure divided into two chambers, said chambers communicating with one another through a restrictor, preferably in the form of a circular disk of porous material, such as sponge rubber having the proper degree of porosity, the respective chambers communicating each with a leg of a water manometer, or with other indicating means, such as a calibrated electronic recording device which would accurately indicate and record or record rapid fluctuations in pressures and therefrom indicate the volume or rate of flow.

It is a further object of my invention to employ the above arrangement for obtaining calibrations which indicate pressure differentials between pressures on opposite sides of the disk taken in either direction and rates of flow or volumes of gas per minute for the several figures indicating pressure differentials. As the differential pressures involved in this arrangement are small and usually vary very little from the total barometric pressures, the volumes indicated are frequencly ambient.

It is a further object of my invention to provide an apparatus for making such calibrations, wherein a multiplicity of sponge rubber disks are employed, all but one adapted to be closed by valves or stoppers, so that the areas of the restrictor through which the gas flows may be enlarged or diminished to obtain different sets of calibrations. In practice a large range of flow, between 1 and 200 liters per minute or more, can be measured with very low differential pressures so the rates of flow being measured are not significantly affected by the measuring device even when the driving pressure is low as in respiration or in ventilating ducts.

It is a further object of my invention to apply the device in connection with the calibrations arrived at to measure the rate of flow of respiration for both inhalation and exhalation, and to obtain accurately the variation in both directions in rate of flow during a respiratory cycle.

Other objects of the invention include making measurements and calibrations showing relative rates of flow of gases of different molecular weights, like helium or argon, or of different densities, as air at ground level and high level, and also to make the numerous sets with exact calibrations when greater accuracy must be obtained for any type of operation in which it is essential or desirable to be accurately informed of the actual ambient volume of the gas which is being delivered as an operation progresses, and also to obtain accurately rapid variations in rate of flow either in the same or in the reverse direction.

The full objects and advantages of my invention will appear in connection with the detailed description thereof which will be given in the succeeding specification, and the novel features of the invention by which the heretofore mentioned advantageous results are obtained will be particularly pointed out in the claims.

In the drawings illustrating an application of my invention in some of its forms:

Fig. 1 is a side elevation view in part schematic, showing an apparatus for employing the invention in making calibrations.

Fig. 2 is an end plan view of the casing shown in Fig. 1 with tubing connections omitted.

Fig. 3 is a graph showing the manner in which calibrations are platted or determined for a fixed area of restrictor and for different areas of restrictor flow.

Fig. 4 is a sectional view taken on line 4—4 of Fig. 5.

Fig. 5 is a sectional view taken on line 5—5 of Fig. 4.

Fig. 6 is a part sectional elevation view showing the application of my invention to means for measuring the volume of inhalation and exhalation during respiration.

An embodiment of means for employing the invention for flow through varying restrictor areas is shown in Figs. 1, 2, 4 and 5. As shown, a cylindrical casing 10 has end plates 11 and 12 and a central partition 13 dividing the space within the casing into chambers 14 and 15 on opposite sides of the partition. The end wall 12 has a central opening 16 surrounded by a cylindrical nipple extension 17 to which may be attached or not, as desired, a hose 18. The end plate 12 also has an opening 19 and outwardly extended nipple 20 which connects with tubing 21.

As best shown in Fig. 4, the partition 13 is provided with a multiplicity of round openings 22 over which are placed restrictor disks 23 which are formed of some porous and substantially homogeneous material, in the example shown of sponge rubber. Each of the disks 23 is held by an outer clamping casing 24 which has an inturned annular rim 25 formed with a valve seat 26 surrounding an opening 27 which has substantially the same area as the opening 22.

Adapted to engage the valve seat 26 so as to close off communication of opening 27 with opening 22 through restrictor body 23 is a valve disk 28 held upon a valve head 29. The valve member 28 is secured to the valve head 29 by a screw 30 which is threaded into a block 31.

Each of the blocks 31 has a socket, indicated at 32 in Figs. 4 and 5, and within the socket 32 is the unthreaded end 33 of a valve stem 34. The valve stem 34 is threaded through a block 35 secured to the plate 11 and extends through a stuffing gasket 36 which is adapted to be placed under pressure by a stuffing box nut 37. Thumb pieces 38 are formed on the ends of the valve stems 34, so turning of the valve stems will open and close the valves.

One of the blocking sponge rubber disks, indicated by the numeral 39 and shown in dotted lines at 40 in Fig. 2, does not have any closure valve connected with it, since there will always be at least one of these disks open to the flow of gas. As shown, in addition to the single continuously open disk 39 there are five additional disks adapted to be closed by the valves above described. It follows that in the use of this device the area of restrictor flow may be from one to six times the area of a single disk.

The chamber 14 has an opening 41 in alignment with opening 16 from chamber 15 and a nipple extension 42 to which is secured tubing 43. This tubing may go directly to a pressure reducing regulator valve 44 having connection with a tank 45 which holds gas or air under pressure, or it may be connected intermediate its ends with a spirometer, not shown. In either case the gas delivered to chamber 14 will be at a constant fixed pressure but the spirometer will indicate the volume of the gas delivered to chambers 14 and 15.

An opening 46 into chamber 14 has connected therewith a nipple extension 47. Upon this nipple extension is a tube 48 which is connected to one leg 49 of a water manometer 50. The other tube 21 heretofore described is connected with the second leg 51 of manometer 50. The two legs of the manometer are respectively connected to the chambers 14 and 15 on opposite sides of one restrictor 39 or any number of said restrictors up to six. This being true, the differential pressure between the two chambers can readily be ascertained.

It follows that, if gas delivery pressures are varied from very low pressure to a desired higher pressure, for each pressure used the differential pressure and rate of flow of the gases can be ascertained and p'atted. The graph of Fig. 3 illustrates how such calibrations may be obtained.

As indicated in the notations on the graph, using a single sponge rubber disk with successively higher pressures and resulting higher differential pressures produces the graph line 52 for air, produces the graph line 53 for a mixture of helium 80% and oxygen 20%, and produces the graph line 54 for commercial argon. The vertical scale shows successive differential pressures, which may be read against the calibrations on the horizontal scale and which later calibrations give the rate of flow in liters per minute ambient, as indicated for one sponge rubber disk in Fig. 6.

Similarly, the graph of Fig. 3 shows the results obtained where three of the sponge rubber disks are open for flow, and where delivery pressures are varied, as in the case of having only one sponge rubber disk open for flow, and when the results of successive differential pressures are p'atted, it gives the graph lines 55 for air, 56 for argon and 57 for a mixture containing 80% helium and 20% oxygen. The appropriate ratios of rates of flow, where in the apparatus shown one and three sponge rubber disks are respectively used, is as shown on the chart, for air 1 to 3.1; helium 80%—oxygen 20%, 1 to 3.2; and commercial argon 1 to 3.5.

In other words, multiplying the area of restriction does not multiply the volume of flow in exactly the same proportion, but in slightly different proportions. However, because significant errors produced by turbulence and by laminar flow are practically eliminated by the porous nature of the restrictor the differences are very small.

These calibrations are taken at normal ground level which at Rochester, Minnesota, where the calibrations were made, would be approximately 1,000 feet above sea level. When the air passed through the disks is of the density of the atmosphere at 30,000 feet elevation, and hence is much more attenuated and of much less density, the rates of flow determined from differences in differential pressures on each side of the restrictor are surprisingly little altered and the approximate ratios of rate of flow using one sponge rubber disk and three sponge rubber disks respectively, is relatively decreased from a ratio of 1 to 3.1 to a ratio of 1 to 2.8. But for ordinary gases such as air, oxygen or nitrogen at ground level the ratio of increase of flow is substantially constant so that against the calibration for the use of one sponge rubber disk it is only necessary to multiply by the ratios determined for any multip'e of that in order to get an approximately correct volume in liters per minute as the rate of flow for that multiple, it being understood, of course, that these ratios are obtained for any number of open disks from one to six, or more.

It is thus apparent that my invention provides very simple and effective means for calibrating differential pressures of different gases and the related volumes of flow in liters or in cubic feet per minute. Since, however, it will be impossible to get restrictors which have exactly the same flow characteristics, it is necessary to prepare a set of ca'ibrations for each restrictor and each set of restrictors.

Further, the same results can be obtained as to variations in area of the restrictors employed by using restrictors of varying areas and having a separate unit for each of said restrictors of different area.

Also the thickness of the restrictors and the fineness of the pores and cavities therein can be varied to meet special needs. In any case, the calibrations as obtained will be essentially independent of the molecular weight or density of the gases and will be relatively linear with increase of differential pressures, and errors produced by lamination and turbulence will be substantially eliminated.

In Fig. 6 is shown an application of the invention to the highly practical use of measuring respiration. In this form of the device an outer casing member 58 has end plates 59 and 60, central partition 61 and opposed chambers 62 and 63. The partition has openings 64 closed by sponge rubber disks 65, one or more of which are open when the apparatus is in use. The opening 66 at the center of end plate 59 is surrounded by an extension member 67 which, however, is open to atmosphere.

One sponge rubber disk 65 in chamber 63 will always be open to chamber 62 while the other sponge rubber disks 65 will be controlled by valve mechanism in all respects the same as that shown in Fig. 4.

The opening 68 in plate 60 has a nipple extension 69 which is connected with a breathing tube 70. The breathing tube connects with a mask 71 adapted to be placed over the face of a subject and form a breathing chamber 72 which is sealed against inlet or outlet of air to the system.

It follows that the subject breathes air by both inhalation and exhalation through the chambers 62 and 63, one or more sponge rubber disks 65, and the breathing tube 70. A manometer in all respects similar to that shown in Fig. 1, has its leg 51 connected by tube 21 with chamber 62 and its leg 49 connected by tube 48 with chamber 63.

With this arrangement the flow of air and respiration will go alterrately from chamber 63 through one or more restrictor disks 65 to chamber 62, and thence through opening 66 to atmosphere upon exhalation. Upon inhalation the air will go from atmosphere through restrictor or restrictors 65 into chamber 63 and thence through the breathing tube to the lungs.

There is alternately established, therefore, maximum differential pressures which are very small for exhalation and inhalation. Upon exhalation the pressure side is in chamber 63 and the low side in chamber 62, and on inhalation the pressure side is in chamber 62 (from air pressure against negative pressure in chamber 63 and connecting parts) and the low pressure side is in chamber 63 where the negative pressure exists. In this case the rate of flow will be determined by the calibrated figures of the flow scale, as shown below the zero line 74.

Although pressure in this case will be of short duration, 1 or 2 seconds, the observer can always read the maximum shown by the respective columns of liquid 79 and 80 in the manometer, and from this, with a degree of experience, he can, using a simple manometer in conjunction with a restrictor device, arrive at a quite accurate result as to the maximum respiratory volumes on inhalation and exhalation of the subject. Accurate results representing the changes in rate of the inspiratory and expiratory flows require the use of some type of recording device.

The advantages of my invention have been in general pointed out quite fully in the preceding specification. A primary advantage is found in the fact that the restrictor device of the flow meters embodying the features of my invention can be constructed for many different types of operation, in which for each restrictor there will be provided in the flow meter arrangement accurate calibrations showing rates of flow in liters or cubic feet per minute for any desired volumes, and at any pressures of delivery.

A particular advantage of my invention comes from the fact that it is available for use with gases flowing at very low pressures. The calibrations arrived at in connection with the use of my invention are, therefore, accurate when calibrated for very low pressures as well as for the calibrations at high pressures. The invention has high utility in connection with flow meters designed for practically any form of use and is readily applicable for nearly any volume or differential pressure demands.

A further great advantage of my invention comes from the fact that it adapts itself very readily to measuring flow of gases going through the apparatus in either direction. This feature of the invention is of marked use clinically, and in connection with some aviation problems, because it enables an apparatus made in accordance with my invention to be adapted for measuring volumes of gases moved respectively upon inhalation and exhalation in respiration, thus establishing for any individual his or her exact respiratory rate.

Another advantage of my invention comes from the fact that it is well adapted to use in different types of industrial operations where accurate measurements are needed of differential pressures and rates of flow of gases, such as air, at very low pressure. Among such industrial operations where my invention can be used with great advantage are those in connection with the design and installation of air-conditioning apparatus or of heating appliances where the heat is conveyed by the movement of warm or heated air, such for example as in connection with heating of spaces by what is known as a hot air furnace, either where the air is moved and the circulation maintained by gravity due to the different temperatures of the outgoing heated air and the returned cooled air, or where the air is moved by mechanical means such as a blower.

The practice in making these measurements has in general been the employment of a differential type of gauge associated with a manometer and by noting the relation between the pressures applied at different points by two instruments designated respectively as a piezometer and a Pitot tube. The piezometer obtains the relative pressures about the outer perimeter of the inside of a pipe, which is called the static pressure, while the Pitot tube gets the pressure at a central point of the moving column, which is called the dynamic pressure, and through complicated mechanical calculations a result is obtained which is supposed to show the differential pressures in the piezometer and the Pitot tube, which, by proper formulation and computation, may be translated into rate of flow.

This system has not been satisfactory; first, because it may embody serious inaccuracies due to turbulence and flow lamination of the gaseous fluid at the points where the pressures are taken, and second, because of the requirement for long and time-consuming mathematical calculations based both on the data shown by the readings, and upon certain assumptions dependent upon the size of pipes and their lengths and the bends therein.

By using in connection with my invention a sponge rubber restrictor of the area or in excess of the area of the outlet duct and causing the entire flow of gas from the duct to pass through this restrictor and taking readings of a manometer having its legs extending into areas on opposite sides of the restrictor, differential pressures and resulting rates of flow applied thereto may be readily obtained and calibrated, usually in cubic feet per minute, for use on the job.

To assure accuracy of readings and results with extensive use of my invention the restrictor material will be held for easy removal for cleaning. Also, where sponge rubber is used, or materials of like characteristic, it will be easy to clean and replace without altering its action so as to effect the original calibrations.

There are many other applications of my invention to industrial operations which may be successfully employed, but those given here are considered sufficient to point out the utility and advantages of the invention as applied to the easy and accurate measurement of the flow of gases especially at low or very low pressures.

I claim:

1. A flow meter, comprising a casing having a chamber therein of much greater transverse dimensions than depth, means including a gas flow restrictor dividing the space within the casing into two opposed chambers, each having the same transverse dimensions as and less depth than that of the first named chamber, said flow restrictor consisting of a layer of substantially homogeneous porous material of such nature as to prevent turbulence or flow laminations of the gas as it passes through and from the restrictor, means to admit gas under pressure to one chamber and to discharge it from the other chamber after it is passed through said material, said flow meter combination being adapted for use in establishing the differential pressures of the gas in the two chambers at varying rates of flow.

2. A flow meter, comprising a cylindrical casing having a chamber therein of much greater diameter than depth, means including a gas flow restrictor dividing the space within the casing into opposing chambers, each having the same diameter as and less depth than that of the first named chamber, said partition having an opening therethrough, a thickened disk of sponge rubber positioned over the opening, a conduit and valve means controlling movement of gas under pressure to cause it to enter one of the chambers and to move through the disk and leave the other chamber, said flow meter combination being adapted for use in establishing the differential pressures of the gas in the two chambers at varying rates of flow and for establishing a scale having calibrations for showing the liters per minute the volume of gas going through the meter at the differential pressure indicated.

3. A flow meter, comprising a cylindrical casing having a chamber therein of much greater diameter than depth, means including a gas flow restrictor dividing the space within the casing into opposing chambers, each having the same diameter as and less depth than that of the first named chamber, said partition having a multiplicity of openings therethrough, a disk of sponge rubber positioned over each of said openings, controllable means to close any member but one of said openings, a conduit and valve means controlling movement of the gas under pressure to cause it to enter one of the chambers and move through the disks not closed and to thereafter leave the other chamber, said flow meter combination being adapted for use in establishing the differential pressures of the gas in the two chambers at varying rates of flow.

4. A flow meter, comprising a cylindrical casing having a chamber therein of much greater diameter than depth, means including a gas flow restrictor dividing the space within the casing into opposing chambers, each having the same diameter as and less depth than that of the first named chamber, said partition having a multiplicity of openings therethrough, a disk of sponge rubber positioned over each of said openings, a valve over each of said disks but one adapted to open and close said openings independently, a conduit and valve means controlling movement of the gas under pressure to cause it to enter one of the chambers and pass through the disks not closed and to thereafter leave the other chamber, said flow meter combination being adapted for use in establishing the differential pressures of the gas in the two chambers at varying rates of flow.

5. A flow meter for use in measuring respiration, comprising a casing, having a chamber therein of much greater transverse dimensions than depth, a transverse partition dividing the space within the casing into two opposed transverse chambers, a mask and a breathing tube connected with one of said chambers and adapted to convey gases in respiration to it and from it, an opening from the other chamber to atmosphere adapted to convey air into and from it during respiration, an opening through the partition covered by a disk of sponge rubber, a manometer having one of its legs connected with one chamber and the other leg connected with the other chamber for indicating the differential pressures of the chambers alternately for inhalation and exhalation, and a scale against which said differential pressure indications may be read showing the rates of flow per minute determined by the maximum differential pressure.

6. A flow meter for use in measuring respiration, comprising a casing, having a chamber therein of much greater transverse dimensions than depth, a transverse partition dividing the space within the casing into two opposed transverse chambers, a mask and a breathing tube connected with one of said chambers and adapted to convey gases in respiration to it and from it, an opening from the other chamber to atmosphere adapted to convey air into and from it during respiration, a multiplicity of openings through the partition each covered by a disk of sponge rubber and valves for opening and closing all but one of said disks, a manometer having one of its legs connected with one chamber and the other leg connected with the other chamber for indicating the differential pressures of the chambers alternately for inhalation and exhalation, a scale having a zero point against which said differential pressure indications may be read either above or below the zero point showing the rates of flow per minute determined by the maximum differential pressures for exhalation and inhalation respectively, and ratio indications on the scale for effecting determination of volumes where more than one disk is employed.

WALTER M. BOOTHBY.

REFERENCES CITED

The following references are of record in the file of this patent:

UNITED STATES PATENTS

| Number | Name | Date |
|---|---|---|
| 1,055,063 | Meriam | Mar. 4, 1913 |
| 1,298,532 | Mapelsden | Mar. 25, 1919 |
| 1,854,727 | Alkire | Apr. 19, 1932 |

FOREIGN PATENTS

| Number | Country | Date |
|---|---|---|
| 435,176 | Great Britain | June 11, 1934 |
| 88,064 | Switzerland | Feb. 1, 1921 |
| 121,334 | Austria | Feb. 10, 1931 |